Feb. 14, 1967          C. J. PETERS          3,304,428
            TRANSMISSION LINE LIGHT MODULATOR
Filed Dec. 18, 1964                          2 Sheets-Sheet 1
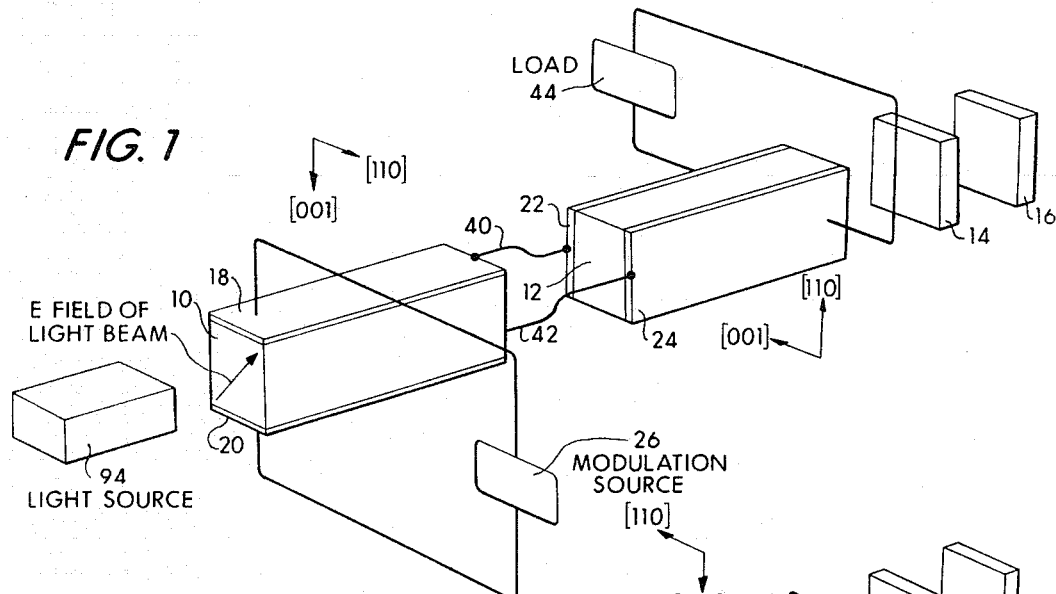
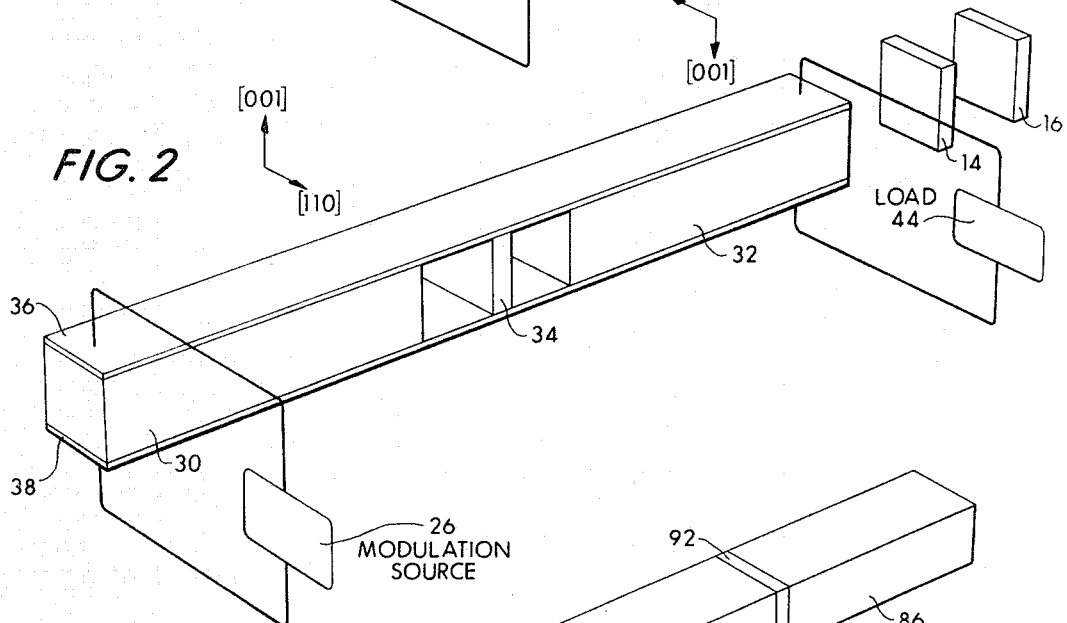
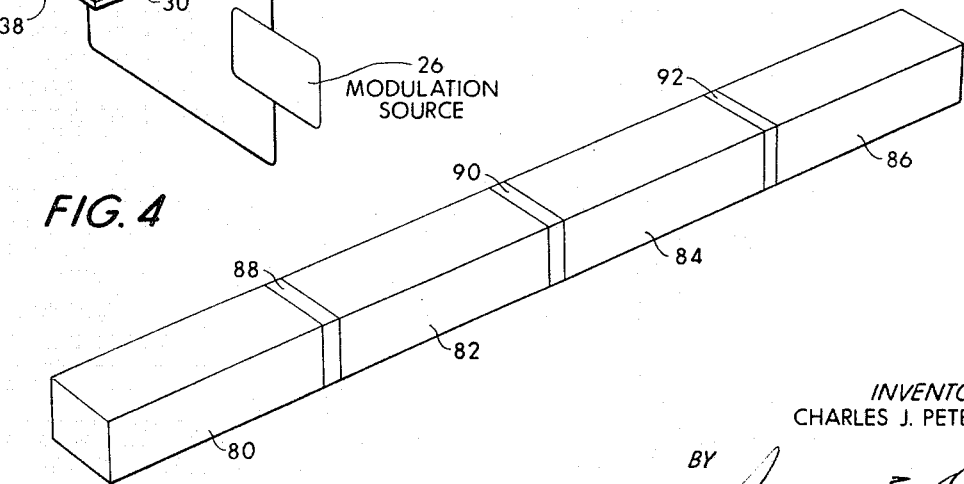
INVENTOR
CHARLES J. PETERS
BY
*Sherman E. Olson*
ATTORNEY Feb. 14, 1967     C. J. PETERS     3,304,428
TRANSMISSION LINE LIGHT MODULATOR
Filed Dec. 18, 1964     2 Sheets-Sheet 2

INVENTOR
CHARLES J. PETERS

BY *Spencer E. Olson*

ATTORNEY

3,304,428
TRANSMISSION LINE LIGHT MODULATOR
Charles J. Peters, Wayland, Mass., assignor to Sylvania Electric Products Inc., a corporation of Delaware
Filed Dec. 18, 1964, Ser. No. 419,465
5 Claims. (Cl. 250—199)

This invention relates to light modulators and more particularly to amplitude modulators capable of operation over a wide bandwidth.

In co-pending application Ser. No. 195,880, filed May 18, 1962, and assigned to the same assignee as the present application, a light modulator is described which employs a traveling wave structure with a suitably oriented electro-optic crystal to provide wideband phase modulation. Briefly, this phase modulator comprises an electro-optic crystal positioned between a traveling wave structure, such as a parallel plate transmission line, and oriented such that the modulation potential is applied along the [001] crystal axis. The traveling wave structure is designed to provide equality in the velocity of light through the crystal and the velocity of the modulating signal through the crystal to thereby achieve wideband operation. A coherent light beam to be modulated is transmitted along the length of the transmission line with its electric vector oriented along the [110] crystal axis. The index of refraction along the [110] axis varies by virtue of the modulation signal, thereby causing phase modulation of the light beam. Applicant has discovered that similar light modulation apparatus can be used to provide wideband amplitude modulation. In addition, unique temperature compensation techniques are provided to compensate for variation in operating point with ambient temperature, and deflection caused by temperature gradients existing within the device.

In accordance with the present invention, the modulating potential is applied along the [001] crystal axis, as in the above-described phase modulator; however, the incident light beam is oriented with its electric vector intermediate the crystal axes, typically at 45° to the [001] axis. The index of refraction along the [110] direction varies with the applied modulating potential, causing the component of incident light parallel to the [110] direction to be phase modulated in accordance with the modulating signal. The index of refraction along the [001] axis is substantially independent of the applied modulating field; consequently, the incident light component parallel to this direction remains unmodulated. Amplitude modulation is achieved by providing a linear polarizer at the output of the device with its axis collinear with the axis of the incident light beam. Since this polarizer is responsive only to the resultant of the modulated and unmodulated components of the incident light, a linearly polarized output beam of variable amplitude will result.

The natural birefringence of birefringent crystals is a function of temperature, and power losses in the crystal and the modulating electrodes create temperature gradients which can cause decollimation and deflection of the light beam due to variation of the natural birefringence. It is a major feature of the present invention to minimize beam deflection and decollimation by providing a temperature compensating element in conjunction with a thermally stable modulator construction. In essence, temperature compensation is provided by a crystal whose retardation varies opposite to that of the modulator crystal, and by a common structure which is thermally symmetrical to provide minimum temperature gradients throughout the operative device.

The construction and operation of the invention will be better understood from the following detailed description, taken in conjunction with the accompanying drawings, in which:

FIG. 1 is a diagrammatic pictorial representation of one embodiment of the invention;

FIG. 2 is a diagrammatic pictorial representation of another embodiment of the invention;

FIG. 4 is a diagrammatic pictorial view of multiple crystals useful in the invention;

Figure 3:
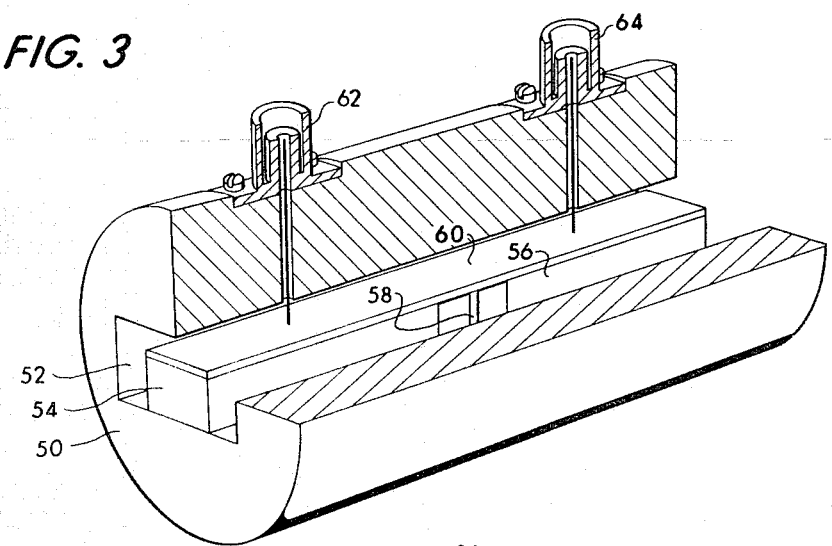
FIG. 3 is a pictorial view, partly in section, of an operative embodiment of the invention.

A diagrammatic representation of the invention is illustrated in FIG. 1 and includes a first electro-optic crystal 10, for example potassium dihydrogen phosphate (KDP), a second electro-optic crystal 12, also typically KDP, disposed with its optical axes orthogonal to that of crystal 10, a retardation plate 14, and a polarizer 16. A pair of electrodes 18 and 20 are disposed on opposite faces of crystal 10, and a like pair of electrodes 22 and 24 are disposed on opposite faces of crystal 12, and operative to apply a modulating potential from source 26 along the [001] axis of each crystal. Corresponding electrodes from each electrode pair are interconnected by a suitable transmission line, shown diagrammatically as 40 and 42. Alternatively, a single pair of electrodes could be employed having a 90° twist therein to provide the requisite orientation to energize the crystals. The electrodes together with the crystal material disposed therebetween function as a transmission line to propagate a modulating signal through the crystals, in the manner described in the above-identified co-pending application. The modulating signal is applied to one end of the electrode pair by source 26, and propagates through the crystal to a load 44 connected to the other end of the electrode pair.

Light passing through crystal 10, for example from light source 94, receives a retardation which is due to the applied modulation field and also due to the natural birefringence of the crystal. The crystal 12 is oriented at a right angle to crystal 10 to cancel the natural birefringence, and to impart an additional modulation retardation to the light. The natural birefringence of the two crystals is identical, causing cancelation of the natural birefringence because of their perpendicular orientation; however, the modulation retardation in both crystals is of opposite sign, causing addition of the modulation components.

In operation, the component of light parallel to the [110] axis of crystal 10 is phase modulated by the modulation field applied by electrodes 18 and 20, which are energized by signal source 26. The component along the [001] axis receives a phase shift, relative to the component along the [110] axis, due to the natural crystal birefringence. When the light traverses crystal 12, the component along the [110] axis of crystal 12, which was the component initially parallel to the [001] axis of crystal 10, is phase modulated by the applied field via electrodes 22 and 24. This phase modulation is of opposite sense to that in crystal 10 due to the polarity of the applied field. The component now along the [001] axis receives a phase shift, relative to the component along the [110] axis, due to the natural birefringence of crystal 12 which is opposite in sense to that occurring during transit through crystal 10. It is evident that a retardation due to natural birefringence has been imparted to both components of the incident light, one component via crystal 10 and the other component via crystal 12. Thus, there is no net retardation since both components receive the same retardation. The retardation due to the applied field, however, is additive due to the orientation of the crystals and the polarity of the applied field. Amplitude modulation is achieved, for example, by passing the light through a quarter wave plate 14 and a polarizer 16 disposed with its axis coincident with the E field of incident light.

Temperature compensation is accomplished by the oppositely directed natural retardation due to the relative orientation of the two crystals, and this compensation can also be provided with crystal 12 unenergized. The intensity of the modulation would, of course, be less since only a portion of the active light path is being modulated. To minimize the length of the modulator, a material with a high thermal coefficient of birefringence could be used for crystal 12.

Another embodiment of the invention is illustrated in FIG. 2, which offers some constructional advantages over the design of FIG. 1. In this embodiment, crystals 30 and 32 are disposed with their axes 180° apart, with a 90° rotator 34 disposed therebetween. Rather than arranging the crystals with their axes relatively orthogonal, as in FIG. 1, the proper relative orientation is provided by rotator 34 which effectively rotates the light beam 90°. Alternatively, a half wave plate can be employed in place of rotator 34 to provide the requisite relative crystal orientation. The 180° disposition of the crystals allows a single pair of straight electrodes 36 and 38 to be employed to energize both crystals. Packaging of this design is simplified over that of FIG. 1, as the coplanar electrically energized electrodes can be more easily insulated from the surrounding package.

The coaxial structure of FIG. 3 houses a modulator of the type shown in FIG. 2, and is designed to provide thermal symmetry to prevent thermal gradients along the length of the modulator which alter the operating point of the device. The cylindrical structure includes a massive metal cylinder 50, formed for example of aluminum, having a rectangular opening 52 therein which extends throughout its length and is symmetrical with the axis of the cylinder. The birefringent crystals 54 and 56 are mounted within opening 52 together with rotator 58. The entire cylinder 50 acts as one modulating electrode, while the second electrode is provided by a thin conductor 60 attached to the upper face of the crystals, for example, by an adhesive. Connection is made to the electrodes via coaxial connectors 62 and 64. the outer conductors of which are connected to cylinder 50, and the inner conductors of which are connected, through suitable holes provided in cylinder 50 to electrode 60. The modulating signal is applied to one connector, while the other is connected to a suitable load. Quarter wave plate 14 and polarizer 16 (shown in FIGS. 1 and 2) can be mounted at the output end of cylinder 50, or, alternatively, external to the cylinder.

Cylinder 50 has a large mass, compared to the active elements of the modulator, and provides an effective thermal sink which prevents thermal gradients along the length of the crystals. The retardation in both crystals which is a function of temperature, is, therefore, uniform since both crystals are on a thermally stable mounting. For optimum performance, the temperature along the length of the modulator should be maintained within .01° C. Greater permissible temperature variation can be tolerated by use of a plurality of crystal pairs, such as in FIG. 4, which depicts four crystals 80, 82, 84 and 86, and rotators 88, 90 and 92 disposed between respective crystals. By providing more than one pair of active crystals, a greater overall gradient can be tolerated since the gradient between adjacent crystals can be held within permissible limits. The overall permissible temperature variation can, therefore, be increased by a factor equal to the number of crystals employed. For example, in the illustrated four crystal embodiment, the overall temperature gradient that can be tolerated across the length of the modulator is four times greater than in the two crystal version.

In a modulator constructed according to the embodiment of FIG. 3, eight KDP crystals each .1 x .1 x 2 inches were employed in an aluminum housing sixteen inches long and one and one-half inches in diameter. With a modulation potential of 50 volts, 100 percent amplitude modulation was achieved over approximately a one gigacycle bandwidth.

Figure 5:
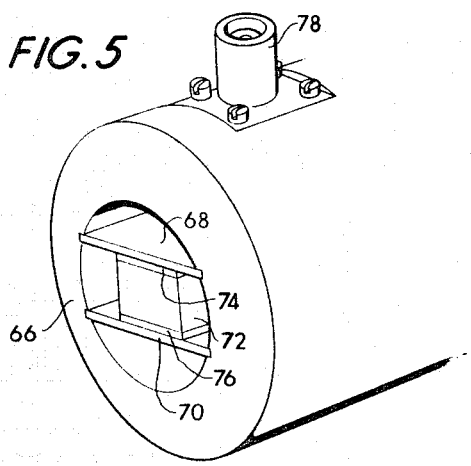
FIG. 5 is a pictorial view, partly broken away, of another embodiment of the invention.

The modulator illustrated in FIG. 5 provides thermal symmetry across the width of the active crystals, as well as along their length, to minimize beam deflection caused by thermal gradients across the crystal width. Referring to FIG. 5, there is shown a thick walled cylindrical metal tube 66, having a pair of thermally conductive, electrically insulating support plates 68 and 70 mounted therein in spaced apart relationship along the length thereof to support a modulator of the type illustrated in FIG. 2. Only a portion of crystal 72 and electrodes 74 and 76 are visible in the figure. Connection to electrodes 74 and 76 is made via coaxial connector 78, the center conductor being connected to electrode 74, while electrode 76 is connected to cylinder 66 thereby making connection to the outer conductor of connector 78. A second coaxial connector (not shown) is provided to complete the energizing circuit, as in FIG. 3. Since this structure is thermally symmetrical across the width of the crystals, there are no thermal gradients across the crystal width and beam deflection is thereby minimized.

Figure 6:
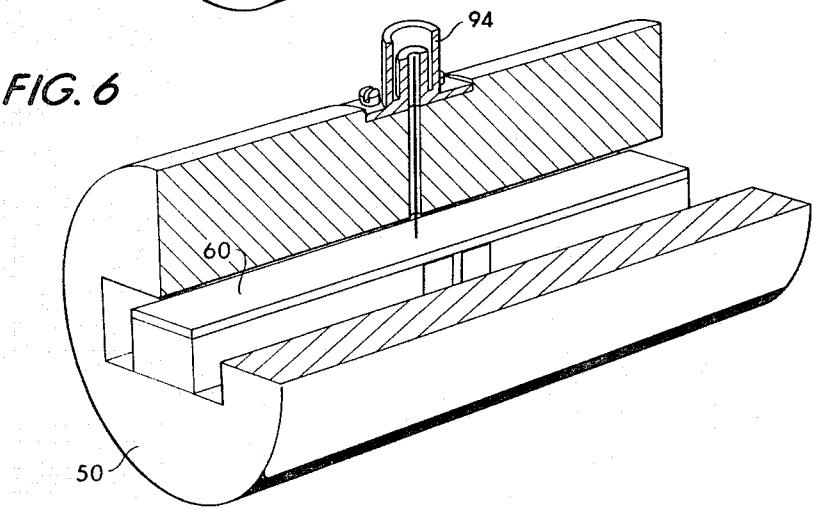
FIG. 6 is a pictorial view, partly broken away, of a further embodiment of the invention.

The modulator need not be constructed in travelling wave form. Rather than acting as a traveling wave structure, the electrodes can be arranged simply to apply a modulating potential across the active crystals. A typical construction of this embodiment is illustrated in FIG. 6, and is similar to that of FIG. 3 except only a single coaxial connector 94 is employed. This connector is disposed centrally of cylinder 50 with its outer conductor connected to cylinder 50, and its inner conductor connected to electrode 60 at its midpoint. Connection is made to the midpoint of electrode 60 in order to maintain thermal symmetry to reduce thermal gradients along the length of the modulator. A modulating potential is applied from a suitable source (not shown) to connector 94 and thence to electrodes 50 and 60 to energize crystals 54 and 56. This embodiment is useful at modulating frequencies up to approximately 30 megacycles; for higher frequencies the traveling wave embodiments are preferred due to their greater bandwidth.

From the foregoing, it is evident that a wideband amplitude light modulator has been provided which is thermally stable and which can provide effective modulation with relatively low driving power. Various modifications will occur to those versed in the art without departing from the true scope of the invention. Accordingly, the invention is not to be limited by what has been particularly shown and described, except as indicated in the appended claims.

What is claimed is:

1. In a light modulation system which includes a light source for transmitting a light beam through a modulator, and a polarizer for producing linearly polarized light of variable amplitude, a light modulator comprising, a conductive cylinder having a rectangular opening coaxial therewith, first and second elongated birefringent electro-optic crystals disposed collinearly in light transmitting relationship within said opening, with the optical axes of said first crystal being disposed 180 degrees to the optical axes of said second crystal, a rotator disposed between said crystals, only one face of each crystal being in contact with said cylinder, a flat electrode attached to the face of said crystals opposite to the face in contact with said cylinder, and coaxial means for applying a modulating potential across said cylinder and flat electrode to thereby vary said crystal birefringence.

2. In a light modulation system which includes a light source for transmitting a light beam through a modulator, and a polarizer for producing linearly polarized light of variable amplitude, a light modulator comprising, a conductive cylinder having an opening coaxial therewith, first and second elongated birefringent electro-optic crystals disposed collinearly in light transmitting relationship within said opening, with the optical axes of said first crystal being disposed effectively orthogonal to the optical axes of said second crystal, one face of each crystal being in contact with said cylinder, an electrode attached to the face of said crystals opposite to the face in contact with said cylinder, and coaxial means for applying a modulating potential across said cylinder and electrode to thereby vary said crystal birefringence.

3. In a light modulation system which includes a light source for transmitting a light beam through a modulator, and a polarizer for producing linearly polarized light of variable amplitude, a light modulator comprising, a conductive cylinder having an opening coaxial therewith, at least one pair of birefringent electro-optic crystals disposed collinearly in light transmitting relationship within said opening, with the optical axes of one crystal of each pair being disposed effectively orthogonal to the optical axes of the other crystal of each pair, one face of each crystal being in contact with said cylinder, an electrode attached to the face of said crystals opposite to the face in contact with said cylinder, and coaxial means for applying a modulating potential across said cylinder and electrode to thereby vary said crystal birefringence.

4. A wideband temperature compensated light modulator comprising, a thermally symmetrical conductive housing, a pair of elongated birefringent electro-optic crystals disposed collinearly in light transmitting relationship in said housing, with the optical axes of one crystal being disposed effectively orthogonal to the optical axes of the other crystal, one face of each crystal being in contact with said housing, an electrode attached to the face of said crystals opposite the face in contact with said housing, and coaxial means for applying a modulating potential across said housing and electrode to thereby vary said crystal birefringence.

5. A wideband light modulator comprising, a thermally symmetrical conductive housing, a pair of elongated birefringent electro-optic crystals disposed collinearly in light transmitting relationship in said housing, with the optical axes of one crystal effectively orthogonal to the optical axes of the other crystal, and travelling wave means including said housing connected to said crystals and operative to apply a modulating potential thereto in a direction orthogonal to the collinear axis thereof.

References Cited by the Examiner

UNITED STATES PATENTS

| 2,753,763 | 7/1956 | Haines | 88—61 |
| 2,766,659 | 10/1956 | Baerwald | 88—61 |
| 2,780,958 | 2/1957 | Wiley | 88—61 |
| 3,167,607 | 1/1965 | Marks et al. | 88—61 |
| 3,215,841 | 11/1965 | Fork | 250—199 |
| 3,239,670 | 3/1966 | Bloembergen | 250—199 |
| 3,239,671 | 3/1966 | Buhrer | 250—199 |

DAVID G. REDINBAUGH, *Primary Examiner.*

JOHN W. CALDWELL, *Examiner.*